(12) United States Patent
Ahn

(10) Patent No.: US 11,895,289 B2
(45) Date of Patent: Feb. 6, 2024

(54) IMAGE DECODING METHOD, IMAGE ENCODING METHOD, IMAGE DECODING DEVICE, IMAGE ENCODING DEVICE, AND COMPUTER-READABLE RECORDING MEDIUM

(71) Applicant: DIGITALINSIGHTS INC., Seoul (KR)

(72) Inventor: Yong Jo Ahn, Seoul (KR)

(73) Assignee: DIGITALINSIGHTS INC., Seoul (KR)

( * ) Notice: Subject to any disclaimer, the term of this patent is extended or adjusted under 35 U.S.C. 154(b) by 246 days.

(21) Appl. No.: 17/419,849

(22) PCT Filed: Dec. 30, 2019

(86) PCT No.: PCT/KR2019/018722
§ 371 (c)(1),
(2) Date: Jun. 30, 2021

(87) PCT Pub. No.: WO2020/141833
PCT Pub. Date: Jul. 9, 2020

(65) Prior Publication Data
US 2022/0078403 A1    Mar. 10, 2022

(30) Foreign Application Priority Data

Jan. 2, 2019  (KR) ........................ 10-2019-0000420
Jan. 4, 2019  (KR) ........................ 10-2019-0001085
Jan. 18, 2019 (KR) ........................ 10-2019-0006842

(51) Int. Cl.
*H04N 19/103*  (2014.01)
*H04N 19/119*  (2014.01)
(Continued)

(52) U.S. Cl.
CPC ......... *H04N 19/103* (2014.11); *H04N 19/119* (2014.11); *H04N 19/159* (2014.11); *H04N 19/176* (2014.11); *H04N 19/50* (2014.11); *H04N 19/70* (2014.11)

(58) Field of Classification Search
CPC .. H04N 19/103; H04N 19/119; H04N 19/159; H04N 19/176; H04N 19/50;
(Continued)

(56) References Cited

U.S. PATENT DOCUMENTS

2020/0288150 A1\* 9/2020 Jun ........................ H04N 19/44
2021/0084325 A1\* 3/2021 Lim ..................... H04N 19/105

FOREIGN PATENT DOCUMENTS

KR  10-2010-0029246 A   3/2010
WO  WO 2008/157269 A2   12/2008
(Continued)

OTHER PUBLICATIONS

Bläser, Max et al., "CE10: Results on Geometric Partitioning (Experiments 3.2.a-3.2.c)", *Joint Video Experts Team (JVET) of ITU-T SG 16 WP 3 and ISO/IEC JTC 1/SC 29/WG 11*, 12th Meeting, Macao, People's Republic of China, Oct. 3-12, 2018 (pp. 1-5).
(Continued)

*Primary Examiner* — Nam D Pham
(74) *Attorney, Agent, or Firm* — NSIP Law

(57) ABSTRACT

Disclosed herein are an image decoding method, an image decoding apparatus, an image encoding method, an image encoding apparatus and a computer-readable recording medium. An image decoding method according to the present invention may include: decoding information on a prediction method of a current block; based on the information on the prediction method, determining a prediction method of the current block; and generating a prediction block of the current block by performing prediction for the current block based on the determined prediction method. Herein, the
(Continued)

information on the prediction method of the current block may include at least one of information on subblock merge, information on MMVD, information on multi hypothesis prediction, and information on partition prediction.

5 Claims, 13 Drawing Sheets

(51) Int. Cl.
*H04N 19/159* (2014.01)
*H04N 19/176* (2014.01)
*H04N 19/50* (2014.01)
*H04N 19/70* (2014.01)

(58) Field of Classification Search
CPC ...... H04N 19/70; H04N 19/105; H04N 19/52; H04N 19/593; H04N 19/184
See application file for complete search history.

(56) References Cited

FOREIGN PATENT DOCUMENTS

| WO | WO 2010/120113 A2 | 10/2010 |
| WO | WO 2017/099385 A1 | 6/2017 |
| WO | WO 2017/188784 A2 | 11/2017 |

OTHER PUBLICATIONS

International Search Report dated Apr. 8, 2020 in counterpart International Patent Application No. PCT/KR2019/018722 (2 pages in English and 2 pages in Korean).
Written Opinion of the International Searching Authority dated Apr. 8, 2020 in counterpart International Patent Application No. PCT/KR2019/018722 (4 pages in Korean).

* cited by examiner

FIG. 3
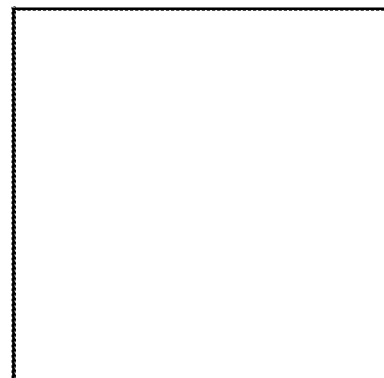
(a) Coding unit (CU)-level prediction
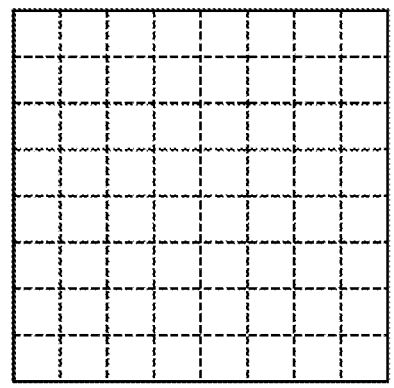
(b) Subblock-level prediction
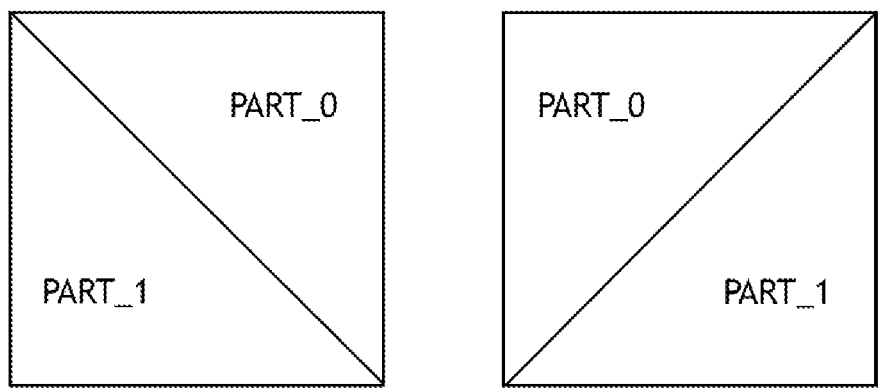
(c) Triangle unit-level prediction

FIG. 4

| merge_data( x0, y0, cbWidth, cbHeight ) { | Descriptor |
|---|---|
|   mmvd_flag[ x0 ][ y0 ] | ae(v) |
|   if( mmvd_flag[ x0 ][ y0 ] == 1 ) { | |
|     mmvd_merge_flag[ x0 ][ y0 ] | ae(v) |
|     mmvd_distance_idx[ x0 ][ y0 ] | ae(v) |
|     mmvd_direction_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] == 1 ) { | |
|       if( MaxNumSubblockMergeCand > 1 ) | |
|         merge_subblock_idx[ x0 ][ y0 ] | ae(v) |
|     } else { | |
|       if( sps_mh_intra_enabled_flag && cu_skip_flag[ x0 ][ y0 ] == 0 && | |
|         ( cbWidth * cbHeight ) >= 64 && cbWidth < 128 && cbHeight < 128 ) { | |
|         mh_intra_flag[ x0 ][ y0 ] | ae(v) |
|         if( mh_intra_flag[ x0 ][ y0 ] ) { | |
|           if ( cbWidth <= 2 * cbHeight || cbHeight <= 2 * cbWidth ) | |
|             mh_intra_luma_mpm_flag[ x0 ][ y0 ] | ae(v) |
|           if( mh_intra_luma_mpm_flag[ x0 ][ y0 ] ) | |
|             mh_intra_luma_mpm_idx[ x0 ][ y0 ] | ae(v) |
|         } | |
|       } | |
|       if( sps_triangle_enabled_flag && slice_type == B && | |
|         cbWidth * cbHeight >= 64 && !mh_intra_flag[ x0 ][ y0 ] ) | |
|         merge_triangle_flag[ x0 ][ y0 ] | ae(v) |
|       if( merge_triangle_flag[ x0 ][ y0 ] ) | |
|         merge_triangle_idx[ x0 ][ y0 ] | ae(v) |
|       else if( MaxNumMergeCand > 1 ) | |
|         merge_idx[ x0 ][ y0 ] | ae(v) |
|     } | |
|   } | |
| } | |

FIG. 5

| | Descriptor |
|---|---|
| merge_data( x0, y0, cbWidth, cbHeight ) { | |
|   if( MaxNumSubblockMergeCand > 0 && cbWidth >= 8 && cbHeight >= 8 ) | |
|     merge_subblock_flag[ x0 ][ y0 ] | ae(v) |
|   if( merge_subblock_flag[ x0 ][ y0 ] == 1 ) { | |
|     if( MaxNumSubblockMergeCand > 1 ) | |
|       merge_subblock_idx[ x0 ][ y0 ] | ae(v) |
|   } else { | |
|     if( sps_mh_intra_enabled_flag && cu_skip_flag[ x0 ][ y0 ] == 0 && <br>       ( cbWidth * cbHeight ) >= 64 && cbWidth < 128 && cbHeight < 128 ) | |
|       mh_intra_flag[ x0 ][ y0 ] | ae(v) |
|     if( mh_intra_flag[ x0 ][ y0 ] == 1 ) { | |
|       if ( cbWidth <= 2 * cbHeight \|\| cbHeight <= 2 * cbWidth ) | |
|         mh_intra_luma_mpm_flag[ x0 ][ y0 ] | ae(v) |
|       if( mh_intra_luma_mpm_flag[ x0 ][ y0 ] ) | |
|         mh_intra_luma_mpm_idx[ x0 ][ y0 ] | ae(v) |
|     } else { | |
|       if( sps_triangle_enabled_flag && slice_type == B && <br>         cbWidth * cbHeight >= 64 ) | |
|         merge_triangle_flag[ x0 ][ y0 ] | ae(v) |
|       if( merge_triangle_flag[ x0 ][ y0 ] == 1 ) | |
|         merge_triangle_idx[ x0 ][ y0 ] | ae(v) |
|       else { | |
|         mmvd_flag[ x0 ][ y0 ] | ae(v) |
|         if( mmvd_flag[ x0 ][ y0 ] == 1 ) { | |
|           mmvd_merge_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } | |
|       } | |
|     } | |
|     if( MaxNumMergeCand > 1 && !merge_triangle_flag[ x0 ][ y0 ] && <br>       !mmvd_flag[ x0 ][ y0 ]) | |
|       merge_idx[ x0 ][ y0 ] | ae(v) |
|   } | |
| } | |

| merge_data( x0, y0, cbWidth, cbHeight ) { | Descriptor |
|---|---|
|   if( MaxNumSubblockMergeCand > 0 && cbWidth >= 8 && cbHeight >= 8 ) | |
|     merge_subblock_flag[ x0 ][ y0 ] | ae(v) |
|   if( merge_subblock_flag[ x0 ][ y0 ] == 1 ) { | |
|     if( MaxNumSubblockMergeCand > 1 ) | |
|       merge_subblock_idx[ x0 ][ y0 ] | ae(v) |
|   } else { | |
|     if( sps_triangle_enabled_flag && slice_type == B && <br>      cbWidth * cbHeight >= 64 ) | |
|       merge_triangle_flag[ x0 ][ y0 ] | ae(v) |
|     if( merge_triangle_flag[ x0 ][ y0 ] == 1 ) { | |
|       merge_triangle_idx[ x0 ][ y0 ] | ae(v) |
|     } else { | |
|       mmvd_flag[ x0 ][ y0 ] | ae(v) |
|       if( mmvd_flag[ x0 ][ y0 ] == 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( sps_mh_intra_enabled_flag && cu_skip_flag[ x0 ][ y0 ] == 0 && <br>          ( cbWidth * cbHeight ) >= 64 && cbWidth < 128 && cbHeight < 128 ) | |
|           mh_intra_flag[ x0 ][ y0 ] | ae(v) |
|         if( mh_intra_flag[ x0 ][ y0 ] == 1 ) { | |
|           if ( cbWidth <= 2 * cbHeight \|\| cbHeight <= 2 * cbWidth ) | |
|             mh_intra_luma_mpm_flag[ x0 ][ y0 ] | ae(v) |
|           if( mh_intra_luma_mpm_flag[ x0 ][ y0 ] ) | |
|             mh_intra_luma_mpm_idx[ x0 ][ y0 ] | ae(v) |
|         } | |
|         if( MaxNumMergeCand > 1 ) | |
|           merge_idx[ x0 ][ y0 ] | ae(v) |
|       } | |
|     } | |
|   } | |
| } | |

FIG. 10

| | Descriptor |
|---|---|
| coding_unit( x0, y0, cbWidth, cbHeight, treeType ) { | |
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 ) | |
|       pred_mode_flag | ae(v) |
|   } | |
|   if( CuPredMode[ x0 ][ y0 ] == MODE_INTRA ) { | |
|     ... | |
|   } else if( treeType != DUAL_TREE_CHROMA ) { /* MODE_INTER */ | |
|     if( cu_skip_flag[ x0 ][ y0 ] == 0 ) | |
|       merge_flag[ x0 ][ y0 ] | ae(v) |
|     if( merge_flag[ x0 ][ y0 ] ) { | |
|       merge_data( x0, y0, cbWidth, cbHeight ) | |
|     } else { | |
|       if( *conditions 800* ) | |
|         mmvd_flag[ x0 ][ y0 ] | ae(v) |
|       if( mmvd_flag[ x0 ][ y0 ] == 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( tile_group_type == B ) | |
|           inter_pred_idc[ x0 ][ y0 ] | ae(v) |
|         if( sps_affine_enabled_flag && cbWidth >= 16 && cbHeight >= 16 ) { | |
|           inter_affine_flag[ x0 ][ y0 ] | ae(v) |
|           if( sps_affine_type_flag && inter_affine_flag[ x0 ][ y0 ] ) | |
|             cu_affine_type_flag[ x0 ][ y0 ] | ae(v) |
|         } | |
|         if( inter_pred_idc[ x0 ][ y0 ] != PRED_L1 ) { | |
|           if( num_ref_idx_l0_active_minus1 > 0 ) | |
|             ref_idx_l0[ x0 ][ y0 ] | ae(v) |
|           mvd_coding( x0, y0, 0, 0 ) | |
|           if( MotionModelIdc[ x0 ][ y0 ] > 0 ) | |
|             mvd_coding( x0, y0, 0, 1 ) | |
|           if(MotionModelIdc[ x0 ][ y0 ] > 1 ) | |
|             mvd_coding( x0, y0, 0, 2 ) | |
|           mvp_l0_flag[ x0 ][ y0 ] | ae(v) |
|         } else { | |
|           ... | |
|         } | |
|         if( inter_pred_idc[ x0 ][ y0 ] != PRED_L0 ) { | |
|           if( num_ref_idx_l1_active_minus1 > 0 ) | |
|             ref_idx_l1[ x0 ][ y0 ] | ae(v) |

1000 (table), 1010 (mmvd section)

FIG. 11

| coding_unit( x0, y0, cbWidth, cbHeight, treeType ) { | Descriptor |
|---|---|
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 ) | |
|       pred_mode_flag | ae(v) |
|   } | |
|   if( CuPredMode[ x0 ][ y0 ] == MODE_INTRA ) { | |
|     ... | |
|   } else if( treeType != DUAL_TREE_CHROMA ) { /* MODE_INTER */ | |
|     if( cu_skip_flag[ x0 ][ y0 ] == 0 ) | |
|       merge_flag[ x0 ][ y0 ] | ae(v) |
|     if( merge_flag[ x0 ][ y0 ] ) { | |
|       merge_data( x0, y0, cbWidth, cbHeight ) | |
|     } else { | |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
|       if( inter_affine_flag[ x0 ][ y0 ] == 0 && *conditions_900* ) | |
|         mmvd_flag[ x0 ][ y0 ] | ae(v) |
|       if( mmvd_flag[ x0 ][ y0 ] == 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( tile_group_type == B ) | |
|           inter_pred_idc[ x0 ][ y0 ] | ae(v) |
|         if( inter_pred_idc[ x0 ][ y0 ] != PRED_L1 ) { | |
|           if( num_ref_idx_l0_active_minus1 > 0 ) | |
|             ref_idx_l0[ x0 ][ y0 ] | ae(v) |
|           mvd_coding( x0, y0, 0, 0 ) | |
|           if( MotionModelIdc[ x0 ][ y0 ] > 0 ) | |
|             mvd_coding( x0, y0, 0, 1 ) | |
|           if(MotionModelIdc[ x0 ][ y0 ] > 1 ) | |
|             mvd_coding( x0, y0, 0, 2 ) | |
|           mvp_l0_flag[ x0 ][ y0 ] | ae(v) |
|         } else { | |
|           ... | |

FIG. 12
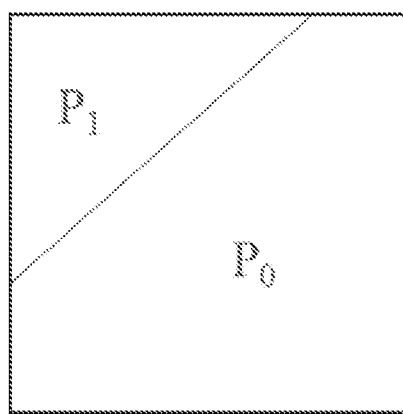
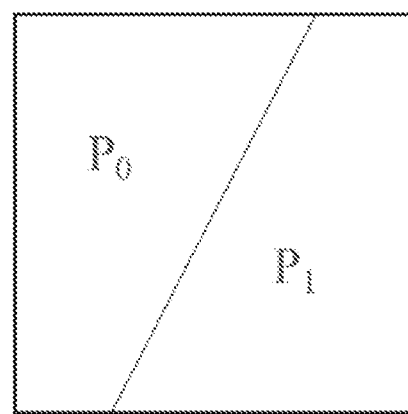
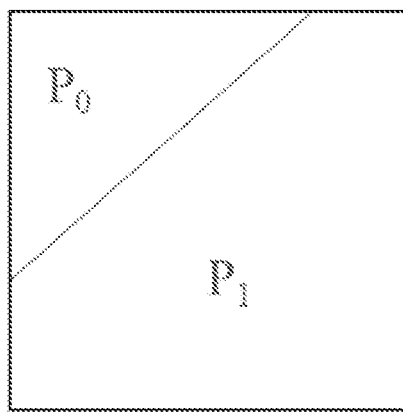
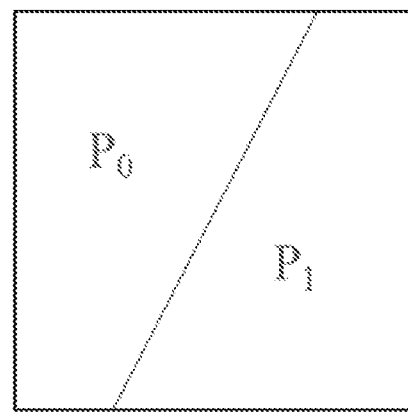

IMAGE DECODING METHOD, IMAGE ENCODING METHOD, IMAGE DECODING DEVICE, IMAGE ENCODING DEVICE, AND COMPUTER-READABLE RECORDING MEDIUM

TECHNICAL FIELD

The present invention relates to image encoding/decoding. Particularly, the present invention relates to a motion merge technique among image encoding/decoding techniques. Specifically, the present invention relates to a method and apparatus for transmitting and parsing a prediction method for a coding block that is encoded in a skip and/or merge mode. In addition, the present invention relates to a method and apparatus for selecting one prediction method among a plurality of prediction methods and for encoding/decoding relevant information based thereon, when transmitting the prediction method and a differential motion vector for a coding block, which is encoded in a skip and/or merge mode. In addition, the present invention relates to an image encoding/decoding method and apparatus signaling information on a prediction method for a coding block that is encoded in a skip and/or merge mode.

BACKGROUND ART

As the market demand for high definition (HD) images is on the rise, techniques of efficiently compressing HD images are required. In response to the market demand, ISO/IEC's MPEG (Moving Picture Expert Group) and ITU-T's VCEG (Video Coding Expert Group) jointly organized the JCT-VC (Joint Collaborative Team on Video Coding), which completed the HEVC (High Efficiency Video Coding) standards in January 2013, and are actively carrying out research and development projects on the next-generation compression standards.

Techniques applied to video compression may mainly include intra-picture prediction (or intra prediction), inter-picture prediction (or inter prediction), transform, quantization, entropy coding and/or in-loop filter. Meanwhile, along with the increasing demand for HD images, the demand for stereoscopic image contents as a new image service is also increasing. Accordingly, image compression techniques for effectively providing HD and ultra HD stereoscopic image contents are under active discussion.

DISCLOSURE

Technical Problem

An objective of the present invention is to provide an image encoding/decoding method and apparatus with enhanced coding efficiency.

Also, another objective of the present invention is, in an image encoding/decoding method and apparatus performing a skip and/or merge mode, to provide an image encoding/decoding method and apparatus performing efficient prediction.

Also, another objective of the present invention is to provide an image encoding/decoding method and apparatus signaling one prediction method among a plurality of prediction methods, when a current coding block is encoded in a skip and/or merge mode.

Also, another objective of the present invention is to provide an image encoding/decoding method and apparatus parsing information on a prediction method of a block that is encoded in a skip and/or merge mode.

Also, another objective of the present invention is to provide an image encoding/decoding method and apparatus performing one or more motion information encoding methods, when a current coding block is not encoded in a skip and/or merge mode.

Also, another objective of the present invention is to provide a computer-readable recording medium storing a bitstream that is generated by an image encoding method and/or apparatus according to the present invention.

Technical Solution

An image decoding method according to one aspect of the present invention may include: decoding information on a prediction method of a current block; based on the information on the prediction method, determining a prediction method of the current block; and generating a prediction block of the current block by performing prediction for the current block based on the determined prediction method. Herein, the information on the prediction method of the current block may include at least one of information on subblock merge, information on MMVD, information on multi hypothesis prediction, and information on partition prediction.

In an image decoding method according to the present invention, the information on partition prediction may be information on triangle partition prediction.

In an image decoding method according to the present invention, the information on multi hypothesis prediction includes information indicating whether or not to perform multi hypothesis prediction for the current block, and when it is determined, according to the information, that the multi hypothesis prediction is not performed for the current block, the information on triangle partition prediction may be signaled.

In an image decoding method according to the present invention, the information on subblock merge may be signaled before the information on MMVD, the information on multi hypothesis prediction, and the information on triangle partition prediction.

In an image decoding method according to the present invention, the information on the prediction method of the current block includes information indicating whether the prediction method of the current block is multi hypothesis prediction or triangle partition prediction, and when it is determined, according to the information, that the prediction method of the current block is not multi hypothesis prediction or not triangle partition prediction, the information on MMVD may be signaled.

In an image decoding method according to the present invention, the information on the prediction method of the current block may be signaled in the order of information on subblock merge, information on MMVD, information on triangle partition prediction, and information on multi hypothesis prediction.

In an image decoding method according to the present invention, the information on partition prediction may be information on geometric partition prediction.

In an image decoding method according to the present invention, the information on geometric partition prediction may be signaled before the information on multi hypothesis prediction.

In an image decoding method according to the present invention, the information on the prediction method of the current block may be signaled in the order of information on subblock merge, information on geometric partition prediction, information on MMVD, and information on multi hypothesis prediction.

An image decoding apparatus according to another aspect of the present invention may include at least one processor. Herein, the processor is configured to decode information on a prediction method of a current block, based on the information on the prediction method, determine a prediction method of the current block, and generate a prediction block of the current block by performing prediction for the current block based on the determined prediction method. Herein, the information on the prediction method of the current block may include at least one of information on subblock merge, information on MMVD, information on multi hypothesis prediction, and information on partition prediction.

An image encoding method according to yet another aspect of the present invention may include: determining a prediction method of a current block; generating a prediction block of the current block by performing prediction for the current block based on the determined prediction method; and encoding information on the prediction method of the current block. Herein, the information on the prediction method of the current block may include at least one of information on subblock merge, information on MMVD, information on multi hypothesis prediction, and information on partition prediction.

In an image encoding method according to the present invention, the information on partition prediction may be information on triangle partition prediction.

In an image encoding method according to the present invention, the information on multi hypothesis prediction includes information indicating whether or not to perform multi hypothesis prediction for the current block, and when the multi hypothesis prediction is not performed for the current block, the information on triangle partition prediction may be encoded.

In an image encoding method according to the present invention, the information on subblock merge may be encoded before the information on MMVD, the information on multi hypothesis prediction, and the information on triangle partition prediction.

In an image encoding method according to the present invention, the information on the prediction method of the current block includes information indicating whether the prediction method of the current block is multi hypothesis prediction or triangle partition prediction, and when the prediction method of the current block is not multi hypothesis prediction or not triangle partition prediction, the information on MMVD may be encoded.

In an image encoding method according to the present invention, the information on the prediction method of the current block may be encoded in the order of information on subblock merge, information on MMVD, information on triangle partition prediction, and information on multi hypothesis prediction.

In an image encoding method according to the present invention, the information on partition prediction may be information on geometric partition prediction.

In an image encoding method according to the present invention, the information on geometric partition prediction may be encoded before the information on multi hypothesis prediction.

In an image encoding method according to the present invention, the information on the prediction method of the current block may be encoded in the order of information on subblock merge, information on geometric partition prediction, information on MMVD, and information on multi hypothesis prediction.

An image encoding apparatus according to yet another aspect of the present invention may include at least one processor. Herein, the processor is configured to determine a prediction method of a current block, generate a prediction block of the current block by performing prediction for the current block based on the determined prediction method, and encode information on the prediction method of the current block. Herein, the information on the prediction method of the current block may include at least one of information on subblock merge, information on MMVD, information on multi hypothesis prediction, and information on partition prediction.

A computer readable recording medium according to yet another aspect of the present invention may store a bitstream generated by an image encoding method of the present invention.

An image encoding/decoding method and apparatus according to the present invention may signal information on a prediction method of a block that is encoded in a skip and/or merge mode.

In addition, one coding block may be predicted using one form of prediction block among various forms of prediction block. Information on one of the forms of prediction block may be signaled.

In addition, according to a predefined signaling order, the one of the forms of prediction block may be selected. When the one of the forms of prediction block is not selected, another form of prediction block and information thereon may be signaled.

An image encoding/decoding method and apparatus according to the present invention may include a process of parsing information on a prediction method of a block that is encoded in a skip and/or merge mode.

In addition, an order of parsing prediction methods of a current coding block may be an order of subblock-based merge (or affine merge), partition prediction, MMVD, and multi hypothesis prediction.

In addition, an order of parsing prediction methods of a current coding block may be an order of subblock-based merge (or affine merge), partition prediction, multi hypothesis prediction, and MMVD.

In addition, a syntax element (e.g., prediction shape) may be used for a prediction form of a current block. The syntax element may use a syntax form composed of 2 bins like 0, 10, 11 and 1, 01, 00.

An image encoding/decoding method and apparatus according to the present invention may use an independent block partition structure for a luma component and a chroma component.

When a luma component block and a corresponding chroma component block have different partition forms, an intra prediction mode of the chroma component block may be derived based on an intra prediction mode of the luma component block. Herein, when at least one of the intra prediction mode of the luma component block and the intra prediction mode of the chroma component block is an expanded angular mode, an additional step for adjusting the intra prediction mode may be performed.

An image encoding/decoding method and apparatus according to the present invention may parse information on whether or not a prediction mode of a current block is a skip and/or merge mode and then, when the prediction mode of the current block is not the skip and/or merge mode, may perform one or more motion information encoding methods.

In addition, the one or more motion information encoding methods may be an AMVP mode or an MMVD mode. In addition, at least one of the AMVP mode and the MMVD mode may use an AFFINE mode. When the AFFINE mode is used, a step may be performed in which 2 pieces of motion information or 3 pieces of motion information are signaled according to a parameter model of the AFFINE mode and are parsed.

In addition, in case of an AMVP mode, the motion information may be a flag or index for a motion prediction value, a prediction direction for motion prediction, a reference picture index used for motion prediction and/or a differential motion vector. In case of an MMVD mode, the motion information may be a flag or index for a motion prediction value, distance information of a differential motion and/or direction information of a differential motion.

In addition, an image encoding/decoding method and apparatus according to the present invention may perform a step of parsing a syntax element concerning whether or not to apply an AFFINE mode and may perform a step of parsing a syntax element for the motion information encoding method according to whether or not to apply the AFFINE mode.

When a prediction mode of a current block is an AFFINE mode, the step of parsing the syntax element for the motion information encoding method may not be performed. When the prediction mode of the current block is an AFFINE mode, motion information may be signaled in an AMVP mode and be parsed.

When the prediction mode of the current block is not an AFFINE mode, the step of parsing the syntax element for the motion information encoding method may be performed.

Advantageous Effects

According to the present invention, an image encoding/decoding method and apparatus with enhanced coding efficiency may be provided.

Also, according to the present invention, in an image encoding/decoding method and apparatus performing a skip and/or merge mode, an image encoding/decoding method and apparatus performing efficient prediction may be provided.

Also, according to the present invention, an image encoding/decoding method and apparatus may be provided which signals one prediction method among a plurality of prediction methods, when a current coding block is encoded in a skip and/or merge mode.

Also, according to the present invention, an image encoding/decoding method and apparatus may be provided which parses information on a prediction method of a block that is encoded in a skip and/or merge mode.

Also, according to the present invention, an image encoding/decoding method and apparatus may be provided which performs one or more motion information encoding methods, when a current coding block is not encoded in a skip and/or merge mode.

Also, according to the present invention, a computer-readable recording medium may be provided which stores a bitstream that is generated by an image encoding method/apparatus according to the present invention.

DESCRIPTION OF DRAWINGS

FIG. 3 is a view illustrating a form of a prediction block according to an embodiment of the present invention.

FIG. 4 is a view for explaining a method of signaling information on a prediction method of a block that is encoded in a skip and/or merge mode according to an embodiment of the present invention.

FIG. 5 is a view for explaining a method of signaling information on a prediction method of a block that is encoded in a skip and/or merge mode according to another embodiment of the present invention.

FIG. 6 is a view for explaining a method of signaling information on a prediction method of a block that is encoded in a skip and/or merge mode according to yet another embodiment of the present invention.

FIG. 10 is a view illustrating a syntax table in which information on a prediction method of a block, which is not encoded in a skip and/or merge mode according to an embodiment of the present invention, is signaled by applying one or more motion information encoding methods according to the present invention.

FIG. 11 is a view illustrating a syntax table in which information on a prediction method of a block, which is not encoded in a skip and/or merge mode according to another embodiment of the present invention, is signaled by applying one or more motion information encoding methods according to the present invention.

FIG. 12 is a view for explaining an example of dividing a current coding block by an arbitrary line.

MODE FOR INVENTION

Figure 1:
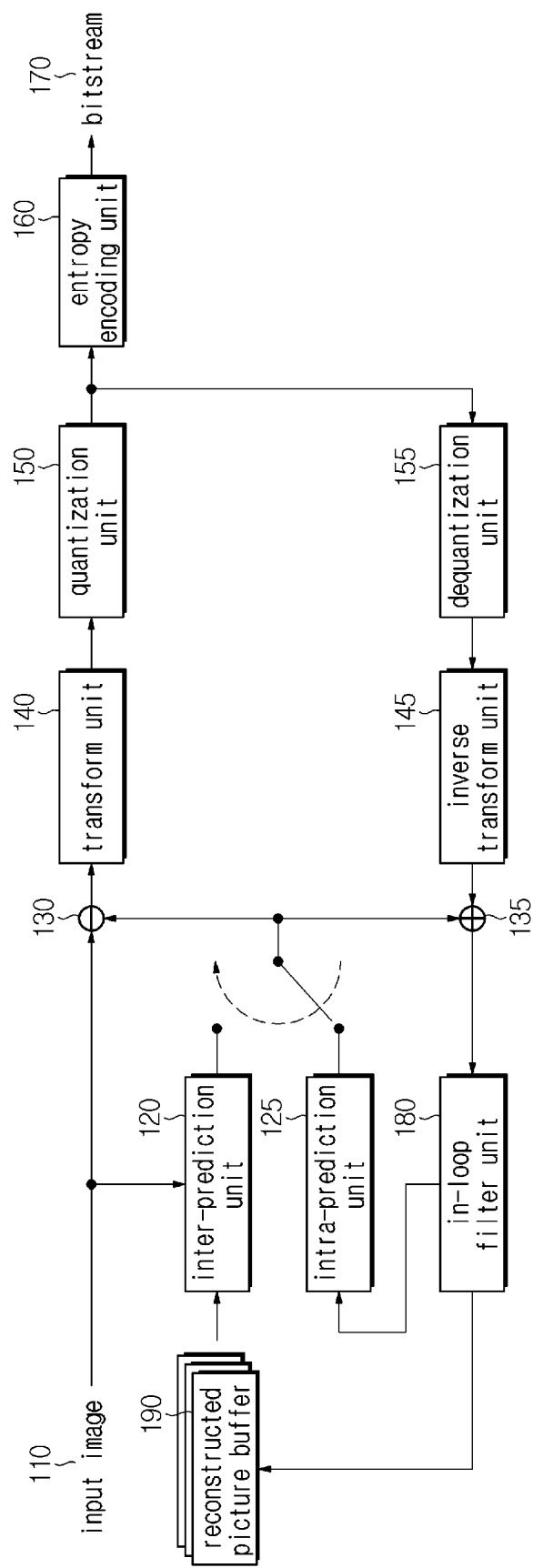
FIG. 1 is a block diagram showing a configuration of an image encoding apparatus according to an embodiment of the present invention.

Embodiments of the present invention will be described in detail with reference to the accompanying drawings so that they may be easily implemented by those skilled in the art. However, the present invention may be embodied in many different forms and is not limited to the embodiments described herein. In addition, in order to clearly describe the present invention, parts not related to the description are omitted from the drawings, and like parts are denoted by similar reference numerals throughout the entire specification.

In the present specification, when a part is 'connected' to another part, this includes not only a case where the parts are directly connected, but also a case where the parts are electrically connected with another element between them.

Also, in the present specification, when a part is referred to as "comprising" a component, it may mean further inclusion of another component not the exclusion thereof, unless explicitly described to the contrary.

Also, terms like 'first', 'second', etc. may be used to describe various components, but the components are not to be construed as being limited to the terms. The terms are only used to differentiate one component from other components.

Also, in the embodiments of the apparatus and method described herein, some of the configuration of the apparatus or some of the steps of the method may be omitted. In addition, the order of some components of the apparatus or some steps of the method may be changed. In addition, another configuration or another step may be inserted into a part of the configuration of the apparatus or a part of the steps of the method.

Also, some components or some steps of a first embodiment of the present invention may be added to a second embodiment or may replace some components or steps of the second embodiment.

Furthermore, constitutional parts shown in the embodiments of the present invention are independently shown so as to represent characteristic functions different from each other. Thus, it does not mean that each constitutional part constitutes a constitutional unit of separated hardware or software. In other words, each constitutional part is described as each of enumerated constitutional parts for convenience. At least two constitutional parts of each constitutional part may be combined to form one constitutional part or one constitutional part may be divided into a plurality of constitutional parts to perform each function. The integrated and separated embodiments of each of these constitutional parts are also included within the scope of the present invention when not departing from the spirit of the present invention.

First, the terms used in the present application will be briefly described as follows.

A video (image) decoding apparatus to be described below may be an apparatus included in a civil security camera, a civil security system, a military security camera, a military security system, a personal computer (PC), a notebook computer, a portable multimedia player (PMP), a wireless communication terminal, a smartphone, and a server terminal like a TV application server and a service server.

In addition, an image decoding apparatus may mean a user terminal and various types of devices, a communication device like a communication modem for communicating with a wired or wireless communication network, and a variety of apparatuses equipped with a memory for storing various programs and data for performing inter prediction or intra prediction for decoding or encoding an image, and a microprocessor for computing and controlling by executing a program.

In addition, an image that is encoded in a bitstream by an image encoding apparatus may be decoded, reconstructed and played after being transmitted to an image decoding apparatus in real time or non-real time through a wired or wireless communication network like the Internet, a local area wireless communication network, a wireless LAN network, a WiBro network, and a mobile communication network or through various communication interfaces like cable and a universal serial bus (USB).

In addition, a bitstream generated by an image encoding apparatus may be stored in a memory. The memory may include both a volatile memory and a nonvolatile memory. In the present specification, a memory may be represented as a recording medium that stores a bitstream.

Typically, a video may be composed of a series of pictures, and each picture may be divided into a coding unit such as a block. In addition, those skilled in the art, to which the present embodiment appertains, will be able to understand that the term "picture" described below may be used interchangeably with other terms having an equivalent meaning like "image" and "frame". In addition, those skilled in the art, to which the present embodiment appertains, will be able to understand that the term "coding unit" may be used interchangeably with other terms having an equivalent meaning like "unit block", "coding block" and "block".

Hereinafter, with reference to the accompanying drawings, the embodiments of the present invention will be described in further detail. While the present invention is being described, a repeated description for the same elements will be omitted.

FIG. 1 is a block diagram showing a configuration of an image encoding apparatus according to an embodiment of the present invention.

A video encoding apparatus according to an embodiment of the present invention may include an inter-prediction unit 120, an intra-prediction unit 125, a subtraction unit 130, a transform unit 140, a quantization unit 150, an entropy encoding unit 160, an inverse-transform unit 145, a dequantization unit 155, an addition unit 135, an in-loop filter unit 180 and/or a reconstructed picture buffer 190.

The inter-prediction unit 120 may generate a prediction signal by performing motion estimation and/or motion prediction using an input image 110 and a reconstructed image (reference image) that is stored in the reconstructed picture buffer 190. That is, the inter-prediction unit 120 may generate a prediction block of a current encoding target block (current block) in a current picture by using a reference picture.

The intra-prediction unit 125 may generate a prediction signal by performing spatial prediction using a pixel value of a neighboring block that is already reconstructed in a current picture spatially adjacent to a current encoding target block. That is, the intra-prediction unit 125 may generate a prediction block of a current encoding target block (current block) by using a pixel of a reconstructed neighboring block in a current picture.

The subtraction unit 130 generates a residual signal by using a prediction signal that is generated through an input image and the inter-prediction unit 120 or the intra-prediction unit 125. For example, the subtraction unit 130 may generate a residual block by subtracting a prediction block of a current encoding target block from the current encoding target block. That is, a residual block may correspond to a difference between a current block and a prediction block. Herein, the prediction block may be an intra-predicted block or an inter-predicted block.

The transform unit 140 may generate a transformed coefficient by performing transform for a residual signal that is generated through the subtraction unit 130. In some cases, the transform may be skipped. That is, no transform may be performed for a residual signal. Whether or not to perform transform may be determined based on information that is signaled through a bitstream. Alternatively, whether or not to perform transform may be determined based on a coding parameter (size, color component, shape and the like) of a current block.

The quantization unit 150 may generate a quantized transformed coefficient by performing quantization for a transformed coefficient that is generated through the transform unit 140. As described above, when no transform is performed for a residual signal, the quantization unit 150 may generate a quantized coefficient by performing quantization for a residual signal that is generated through the subtraction unit 130. An output of the quantization unit 150 may be called a quantized transformed coefficient or a quantized coefficient. In some cases, the quantization may be skipped. That is, no quantization may be performed for a residual signal. Alternatively, no quantization may be performed for a transformed coefficient. Whether or not to perform quantization may be determined based on information that is signaled through a bitstream. Alternatively, whether or not to perform transform may be determined based on a coding parameter (size, color component, shape and the like) of a current block.

Alternatively, whether or not to perform transform and quantization may be determined simultaneously based on information that is signaled through a bitstream. Alternatively, whether or not to perform transform and quantization may be determined simultaneously based on a coding parameter (size, color component, shape and the like) of a current block.

The entropy encoding unit 160 may output a bitstream by performing entropy encoding for coding information like syntax elements and a quantized coefficient that are defined in video compression standards.

The inverse-transform unit 145 and the dequantization unit 155 may perform inversely the above-described operations of the transform unit 140 and the quantization unit 150 respectively. The inverse-transform unit 145 and the dequantization unit 155 may generate a reconstructed residual signal by receiving a quantized coefficient and performing dequantization and inverse transform in sequence.

The addition unit 135 generates a reconstructed signal by using a prediction signal, which is generated through the inter-prediction unit 120 or the intra-prediction unit 125, and a reconstructed residual signal. That is, a current block may be reconstructed by adding a prediction block and a residual block.

A reconstructed signal is delivered to the in-loop filter unit 180, and at least one in-loop filter among a deblocking filter, a sample adaptive offset (SAO) and an adaptive loop filter (ALF) may be applied. A reconstructed signal, to which an in-loop filter is applied, may be stored as a final reconstructed signal in the reconstructed picture buffer 190.

A reconstructed signal stored in the reconstructed picture buffer 190 may be used as a reference signal in the inter-prediction unit 120.

In this specification, "signal" may occasionally mean a block or a picture.

Figure 2:
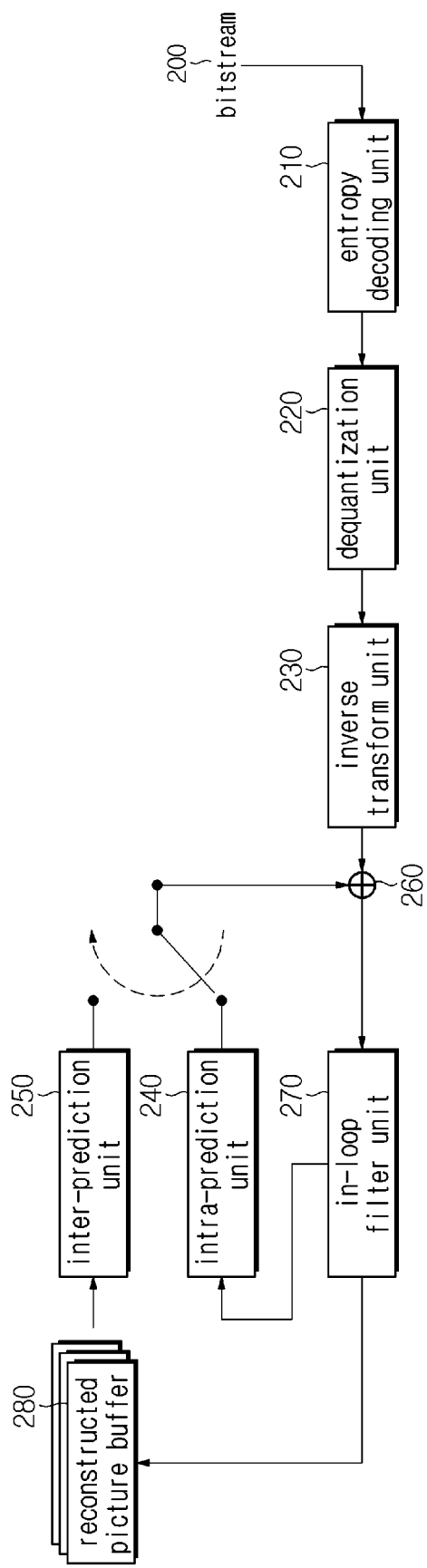
FIG. 2 is a block diagram showing a configuration of an image decoding apparatus according to an embodiment of the present invention.

FIG. 2 is a block diagram showing a configuration of an image decoding apparatus according to an embodiment of the present invention.

An image decoding apparatus according to an embodiment of the present invention may include an entropy decoding unit 210, a dequantization unit 220, an inverse-transform unit 230, an intra-prediction unit 240, an inter-prediction unit 250, an addition unit 260, an in-loop filter unit 270, and a reconstructed picture buffer 280.

The entropy decoding unit 210 may output decoded information like syntax elements and a quantized coefficient by decoding an input bitstream 200.

The dequantization unit 220 and the inverse-transform unit 230 may perform the same function as the dequantization unit and the inverse-transform unit of an image encoding apparatus. That is, the dequantization unit 220 and the inverse-transform unit 230 may output a residual signal by receiving a quantized coefficient and performing dequantization and inverse transform in sequence. In addition, at least one of dequantization and inverse transform may not be performed based on information signaled from a bitstream and/or a coding parameter of a current decoding target block (current block).

The intra-prediction unit 240 may generate a prediction signal by performing spatial prediction using a pixel value of a neighboring block that is already reconstructed in a current picture spatially adjacent to a current decoding target block. That is, the intra-prediction unit 240 may generate a prediction block of a current decoding target block (current block) by using a pixel of a neighboring block that is reconstructed in a current picture.

The inter-prediction unit 250 may generate a prediction signal by performing motion compensation using a motion vector extracted from a bitstream and a reconstructed image (reference image) stored in the reconstructed picture buffer 280. That is, the inter-prediction unit 250 may generate a prediction block of a current decoding target block (current block) in a current picture by using a reference picture.

The addition unit 260 generates a reconstructed signal by using a prediction signal, which is generated through the inter-prediction unit 250 or the intra-prediction unit 240, and a reconstructed residual signal. That is, a current block may be reconstructed by adding a prediction block and a residual block.

A reconstructed signal is delivered to the in-loop filter unit 270, and at least one in-loop filter among a deblocking filter, a sample adaptive offset (SAO) and an adaptive loop filter (ALF) may be applied. A reconstructed signal, to which an in-loop filter is applied, may be stored as a final reconstructed signal in the reconstructed picture buffer 280.

A reconstructed signal stored in the reconstructed picture buffer 280 may be used as a reference signal in the inter-prediction unit 250.

FIG. 3 is a view illustrating a form of a prediction block according to an embodiment of the present invention.

When performing prediction in an image encoding/decoding method and apparatus according to an embodiment of the present invention, a current block may be partitioned as illustrated in FIG. 3, and prediction may be performed for each partitioned block (prediction block).

As illustrated in FIG. 3, an image encoding/decoding method and apparatus according to the present invention may perform prediction by partitioning one coding block into various forms. One coding block may be predicted using one form of prediction block among forms of prediction block illustrated in FIG. 3. In addition, information on which form of prediction block will be used or is used for a current coding block may be signaled.

As described above, one of various forms of prediction block may be applied to a coding block, and one of the forms of prediction block may be selected according to a predefined signaling order. That is, when one form of prediction block is selected, information on other subsequent forms of prediction block in the signaling order may not be signaled. In addition, when one form of prediction block is not selected, information on a next form of prediction block in the signaling order may be signaled.

(a) of FIG. 3 illustrates a case in which one coding block is not partitioned for prediction. In this case, the coding block may be used as a prediction block.

(b) of FIG. 3 illustrates a case in which one coding block is partitioned into a plurality of sub-blocks for prediction. In this case, each of the plurality of sub-blocks may be used as a prediction block.

(c) of FIG. 3 illustrates a case in which one coding block is partitioned into a plurality of triangle blocks for prediction. For example, one coding block may be partitioned for prediction in the diagonal direction or in the anti-diagonal direction. In this case, each of a plurality of triangle blocks may be used as a prediction block. Alternatively, a final prediction block with a coding block size may be generated by weighting a PART_0 prediction block, which is predicted in the coding block size by using information of PART_0, and a PART_1 prediction block, which is predicted in the coding block size by using information of PART_1. For example, based on a distance from a position of a sample in a prediction block to a diagonal line or an anti-diagonal line used for partitioning, weights may be derived which are to be applied to a sample of the PART_0 prediction block in the position and a sample of the PART_1 prediction block in the position. Further, a weighted sample value of the position may be calculated by obtaining a weighted sum by applying the derived weights to the sample of the PART_0 prediction block and the sample of the PART_1 prediction block respectively.

FIG. 4 is a view for explaining a method of signaling information on a prediction method of a block that is encoded in a skip and/or merge mode according to an embodiment of the present invention.

For example, FIG. 4 is a view illustrating a syntax table signaling information on a prediction method of a block that is encoded in a skip and/or merge mode according to an embodiment of the present invention.

As illustrated in FIG. 4, a block, which is encoded in a skip and/or merge mode, may be encoded/decoded by selecting one method among a plurality of prediction methods.

mmvd_flag 410 is information indicating whether or not to use a method of transmitting a motion difference in a skip and/or merge mode.

In addition, merge_subblock_flag 420 is information indicating whether or not to use a prediction method that partitions one coding block into a plurality of sub-blocks.

In addition, mh_intra_flag 430 is information indicating whether or not to use a prediction method that applies a plurality of prediction methods to one coding block and combines prediction results of the plurality of prediction methods. For example, when a prediction method is used which performs both inter prediction and intra prediction for one coding block and generates a final prediction block by combining a prediction block generated by the inter prediction and a prediction block generated by the intra prediction, mh_intra_flag may be set to a first value (e.g., 1).

In addition, as illustrated in (c) of FIG. 3, merge_triangle_flag 440 is information indicating whether or not to use a prediction method that partitions one coding block into 2 triangular shapes.

For a block that is encoded in a skip and/or merge mode, one of a plurality of prediction methods may be selected. In addition, one prediction method thus selected may be signaled using the syntax structure illustrated in FIG. 4. A prediction method used for a coding block may be signaled according to the order in the syntax structure illustrated in FIG. 4. That is, a prediction method used for a coding block among a plurality of prediction methods may be signaled based on a predetermined selection order.

A selection order of the prediction methods may be an order of MMVD, subblock-based merge or affine merge, multi hypothesis prediction, and triangle partition prediction. However, a selection order (signaling order) of prediction methods is not limited to the above example.

A selection order of the prediction methods may be determined based on coding efficiency of each prediction. For example, a prediction method with high coding efficiency has a higher probability of being selected than a prediction method with low coding efficiency. In addition, once a prediction method of a coding block is determined, it is not necessary to signal information on a prediction method subsequent to the determined prediction method in a signaling order. Accordingly, as information on a prediction method with high coding efficiency is signaled prior to information on a prediction method with low coding efficiency, signaling overhead of prediction method may be minimized.

Subblock-based merge has higher coding efficiency than multi hypothesis prediction. In addition, subblock-based merge has higher coding efficiency than triangle partition prediction. In addition, multi hypothesis prediction has higher coding efficiency than triangle partition prediction. Accordingly, information on subblock-based merge may be signaled prior to information on multi hypothesis prediction and information on triangle partition prediction. In addition, information on multi hypothesis prediction may be signaled prior to information on triangle partition prediction.

In addition to this, a selection order of the prediction methods may be determined based on selection frequency of each prediction method. For example, when signaling for a prediction method with high selection frequency is preferred, signaling overhead for a method with low selection frequency may be minimized. Alternatively, the signaling method of prediction modes based on coding efficiency and the signaling method of prediction method based on selection frequency may be mixed to be used.

In an embodiment, subblock-based merge has higher coding efficiency than multi hypothesis prediction, triangle partition prediction, and regular merge prediction. Accordingly, signaling for a subblock merge mode may precede other skip or merge modes. In addition to this, in case of the regular merge mode, there is a statistical feature of highest selection frequency as compared to other skip or merge modes. Accordingly, signaling for the regular merge mode may precede signaling for a multi hypothesis prediction or triangle partition prediction mode.

In the example illustrated in FIG. 4, information on MMVD is signaled prior to information on subblock-based merge. However, the present invention is not limited thereto, and information on subblock-based merge may be signaled prior to information on MMVD. In this case, the selection order of the prediction methods may be an order of subblock-based merge, MMVD, multi hypothesis prediction, and triangle partition prediction.

In the example illustrated in FIG. 4, when a prediction method of a coding block is not determined to be multi hypothesis prediction, triangle partition prediction may be performed. Specifically, when information on whether or not to perform multi hypothesis prediction (e.g., mh_intra_flag) has a second value (e.g., 0), it may be determined that multi hypothesis prediction is not to be performed for a coding block. Accordingly, for example, when mh_intra_flag is 0, information on triangle partition prediction of a coding block may be signaled. Herein, the information on triangle partition prediction may mean direction information for a triangle partition and merge candidate index information for two triangle partitions. In addition, the triangle partition is not limited to triangle partition but may refer to geometric partition that partitions one rectangular or square block by any one line.

Alternatively, for a block that is encoded in a skip and/or merge mode, two or more among the plurality of prediction methods may be selected and combined.

According to the embodiment illustrated in FIG. 4, when the prediction method of a current coding block is selected as MMVD, subblock-based merge, multi hypothesis prediction and triangle partition prediction are not selected. Accordingly, when the prediction method of a current coding block is not selected as MMVD, information on subblock-based merge, multi hypothesis prediction and/or triangle partition prediction may be signaled and parsed.

When the prediction method of a current coding block is selected not as MMVD but as subblock-based merge, multi hypothesis prediction and/or triangle partition prediction is not selected. Accordingly, when the prediction method of a current coding block is not MMVD and is not selected as subblock-based merge, information on multi hypothesis prediction and/or triangle partition prediction may be signaled and parsed.

When the prediction method of a current coding block is neither MMVD nor subblock-based merge but is selected as multi hypothesis prediction, triangle partition prediction is not selected. Accordingly, when the prediction method of a current coding block is neither MMVD nor subblock-based merge and is not selected as multi hypothesis prediction, information on triangle partition prediction may be signaled and parsed.

FIG. 5 is a view for explaining a method of signaling information on a prediction method of a block that is encoded in a skip and/or merge mode according to another embodiment of the present invention.

For example, FIG. 5 is a view illustrating a syntax table signaling information on a prediction method of a block that is encoded in a skip and/or merge mode according to another embodiment of the present invention.

As illustrated in FIG. 5, a block, which is encoded in a skip and/or merge mode, may be encoded/decoded by selecting one method among a plurality of prediction methods.

In the example illustrated in FIG. 5, a selection order of the prediction methods may be an order of subblock-based merge 510, multi hypothesis prediction 520, triangle partition prediction 530, and MMVD 540. However, a selection order (signaling order) of prediction methods is not limited to the above example.

Among the prediction methods, information on subblock-based merge having highest coding efficiency may be signaled prior to information on the other prediction methods.

According to the embodiment illustrated in FIG. 5, when the prediction method of a current coding block is selected as subblock-based merge, multi hypothesis prediction, triangle partition prediction and MMVD are not selected. Accordingly, when the prediction method of a current coding block is not selected as subblock-based merge, information on multi hypothesis prediction, triangle partition prediction and/or MMVD may be signaled and parsed.

When the prediction method of a current coding block is not subblock-based merge but is selected as multi hypothesis prediction, triangle partition prediction and MMVD are not selected. Accordingly, when the prediction method of a current coding block is not subblock-based merge and is not selected as multi hypothesis prediction, information on triangle partition prediction and/or MMVD may be signaled and parsed.

When the prediction method of a current coding block is neither subblock-based merge nor multi hypothesis prediction but is selected as triangle partition prediction, MMVD is not selected. Accordingly, when the prediction method of a current coding block is neither subblock-based merge nor multi hypothesis prediction and is not selected as triangle partition prediction, information on MMVD may be signaled and parsed.

As described above, in the example illustrated in FIG. 5, information on MMVD may be signaled when the prediction method of a current coding block does not correspond to subblock-based merge, multi hypothesis prediction and triangle partition prediction. For example, based on first information (e.g., flag) indicating whether or not the prediction method of a current coding block is subblock-based merge, it may be determined that the prediction method of the current coding block is not subblock-based merge. When the prediction method of a current coding block is not subblock-based merge, second information indicating whether or not the prediction method of the current coding block is multi hypothesis prediction or triangle partition prediction may be signaled. When the second information has a first value, it may be determined that the prediction method of the current coding block is multi hypothesis prediction or triangle partition prediction. On the other hand, when the second information has a second value, it may be determined that the prediction method of the current coding block is not multi hypothesis prediction or triangle partition (geometric partition) prediction, and this case may be referred to as regular merge. When the second information has the second value, third information indicating whether or not the prediction method of the current coding block is MMVD may be signaled. Herein, when the third information has a first value, it may be determined that the prediction method of the current coding block is MMVD. That is, as described above, information on MMVD may be signaled and/or parsed based on first information, second information and/or third information.

FIG. 6 is a view for explaining a method of signaling information on a prediction method of a block that is encoded in a skip and/or merge mode according to yet another embodiment of the present invention.

For example, FIG. 6 is a view illustrating a syntax table signaling information on a prediction method of a block that is encoded in a skip and/or merge mode according to yet another embodiment of the present invention.

As illustrated in FIG. 6, a block, which is encoded in a skip and/or merge mode, may be encoded/decoded by selecting one method among a plurality of prediction methods.

In the example illustrated in FIG. 6, a selection order of the prediction methods may be an order of subblock-based merge 610, triangle partition prediction 620, MMVD 630, and multi hypothesis prediction 640. However, a selection order (signaling order) of prediction methods is not limited to the above example.

According to the embodiment illustrated in FIG. 6, when the prediction method of a current coding block is selected as subblock-based merge, triangle partition prediction, MMVD, and multi hypothesis prediction are not selected. Accordingly, when the prediction method of a current coding block is not selected as subblock-based merge, information on triangle partition prediction, MMVD and/or multi hypothesis prediction may be signaled and parsed.

When the prediction method of a current coding block is not subblock-based merge but is selected as triangle partition prediction, MMVD and multi hypothesis prediction are not selected. Accordingly, when the prediction method of a current coding block is not subblock-based merge and is not selected as triangle partition prediction, information on MMVD and/or multi hypothesis prediction may be signaled and parsed.

When the prediction method of a current coding block is neither subblock-based merge nor triangle partition prediction but is selected as MMVD, multi hypothesis prediction is not selected. Accordingly, when the prediction method of a current coding block is neither subblock-based merge nor triangle partition prediction and is not selected as MMVD, information on triangle partition prediction may be signaled and parsed.

As another example, when the prediction method of a current coding block is neither subblock-based merge nor triangle partition prediction but is selected as multi hypothesis prediction, MMVD is not selected. Accordingly, as another example, when the prediction method of a current coding block is neither subblock-based merge nor triangle partition prediction and is not selected as multi hypothesis prediction, information on MMVD may be signaled and parsed.

In the embodiment illustrated in FIG. 6, when information on subblock-based merge is signaled and parsed preferentially and the prediction method of a current coding block is subblock-based merge, only additional information on subblock-based merge may be signaled and parsed. When the prediction method of a current coding block is not subblock-based merge, information on triangle partition prediction may be signaled and parsed secondarily. When the prediction method of a current coding block is not triangle partition prediction, CU-level prediction is performed, and information on a detailed prediction method for the CU-level prediction may be signaled and parsed sequentially.

A signaling order described with reference to FIG. 4 to FIG. 6 may be applied equally in an encoding process and in a decoding process.

In another embodiment, information indicating that CU-level prediction is performed according to a prediction form of a current coding block may be preferentially signaled. When CU-level prediction is performed, information on MMVD and/or multi hypothesis prediction may be sequentially signaled. An image decoding apparatus may parse information on a prediction method in the same order as above. In addition, when CU-level prediction is not performed, information on a corresponding prediction method may be sequentially signaled depending on whether subblock-level prediction is performed or triangle partition prediction is performed.

Figure 7:
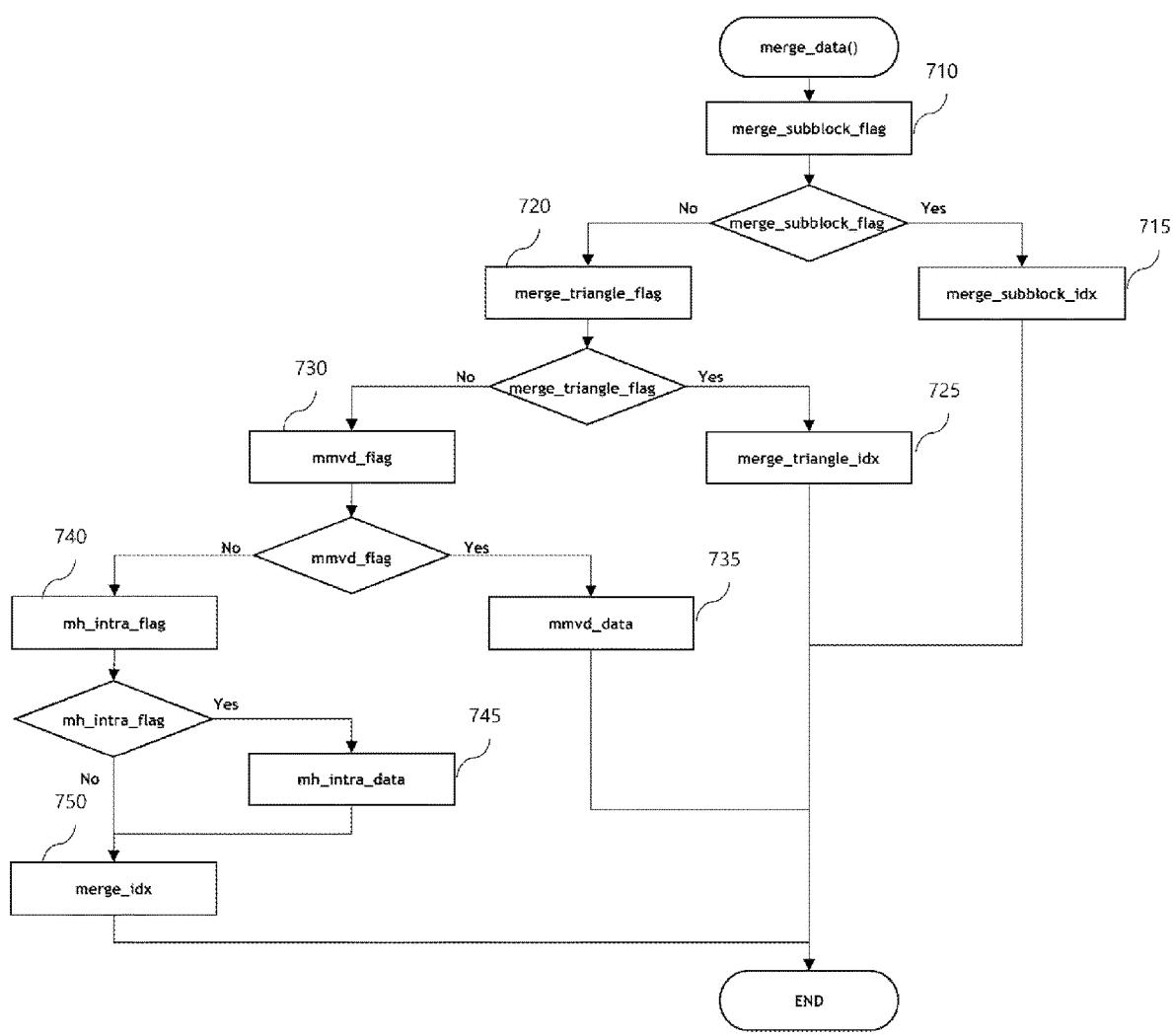
FIG. 7 is a flowchart about a method of parsing information on a prediction method of a block that is encoded in a skip and/or merge mode according to an embodiment of the present invention.

FIG. 7 is a flowchart about a method of parsing information on a prediction method of a block that is encoded in a skip and/or merge mode according to an embodiment of the present invention.

In the embodiment illustrated in FIG. 7, information on prediction methods of a current coding block may be signaled or parsed in the order of subblock-based merge, triangle partition prediction, MMVP and multi hypothesis prediction.

In the embodiment illustrated in FIG. 7, merge_subblock_flag 710 and merge_triangle_flag 720 may be syntaxes indicating a form of predicting a current coding block, that is, a form of a block for prediction.

Alternatively, as described above, the flags may be combined into a single syntax, which may be used to indicate one of two or more block forms for prediction.

Figure 8:
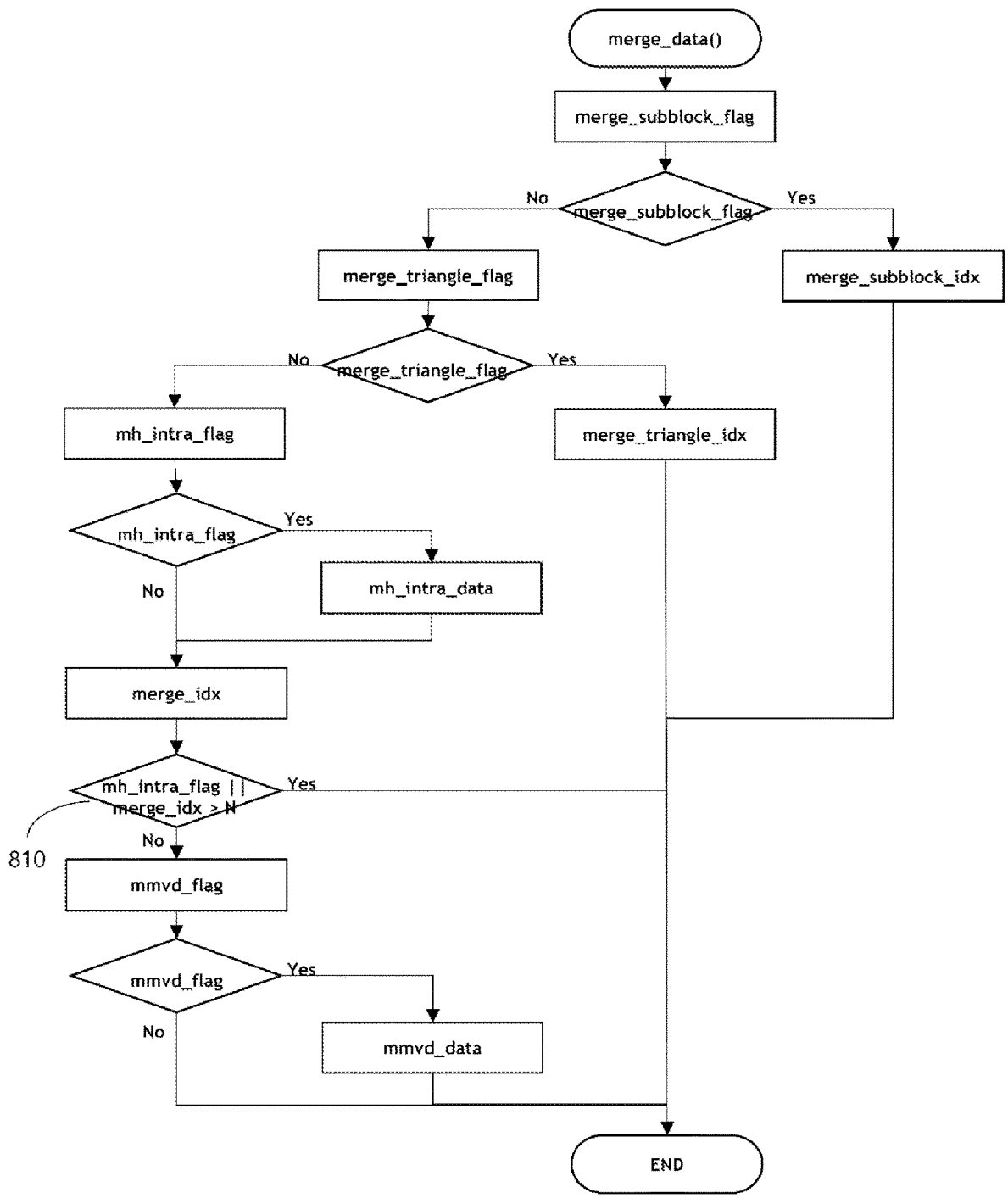
FIG. 8 is a flowchart about a method of parsing information on a prediction method of a block that is encoded in a skip and/or merge mode according to another embodiment of the present invention.

FIG. 8 is a flowchart about a method of parsing information on a prediction method of a block that is encoded in a skip and/or merge mode according to another embodiment of the present invention.

In the embodiment illustrated in FIG. 8, information on prediction methods of a current coding block may be signaled or parsed in the order of subblock-based merge, triangle partition prediction, multi hypothesis prediction and MMVD.

In the embodiment illustrated in FIG. 8, according to a feature of a prediction method, a next syntax to be parsed may be skipped using a predefined condition 810.

For example, as the predefined condition 810, the number of merge candidates used in an MMVD prediction method, a preceding prediction method or whether or not to perform prediction using prediction form may be used.

As an example, merge_idx is parsed first and when the merge_idx is larger than a maximum number (N) of merge candidates used in MMVD, signaling of information on MMVP (mmvd_flag, mmvd_data, etc.) may be skipped.

Figure 9:
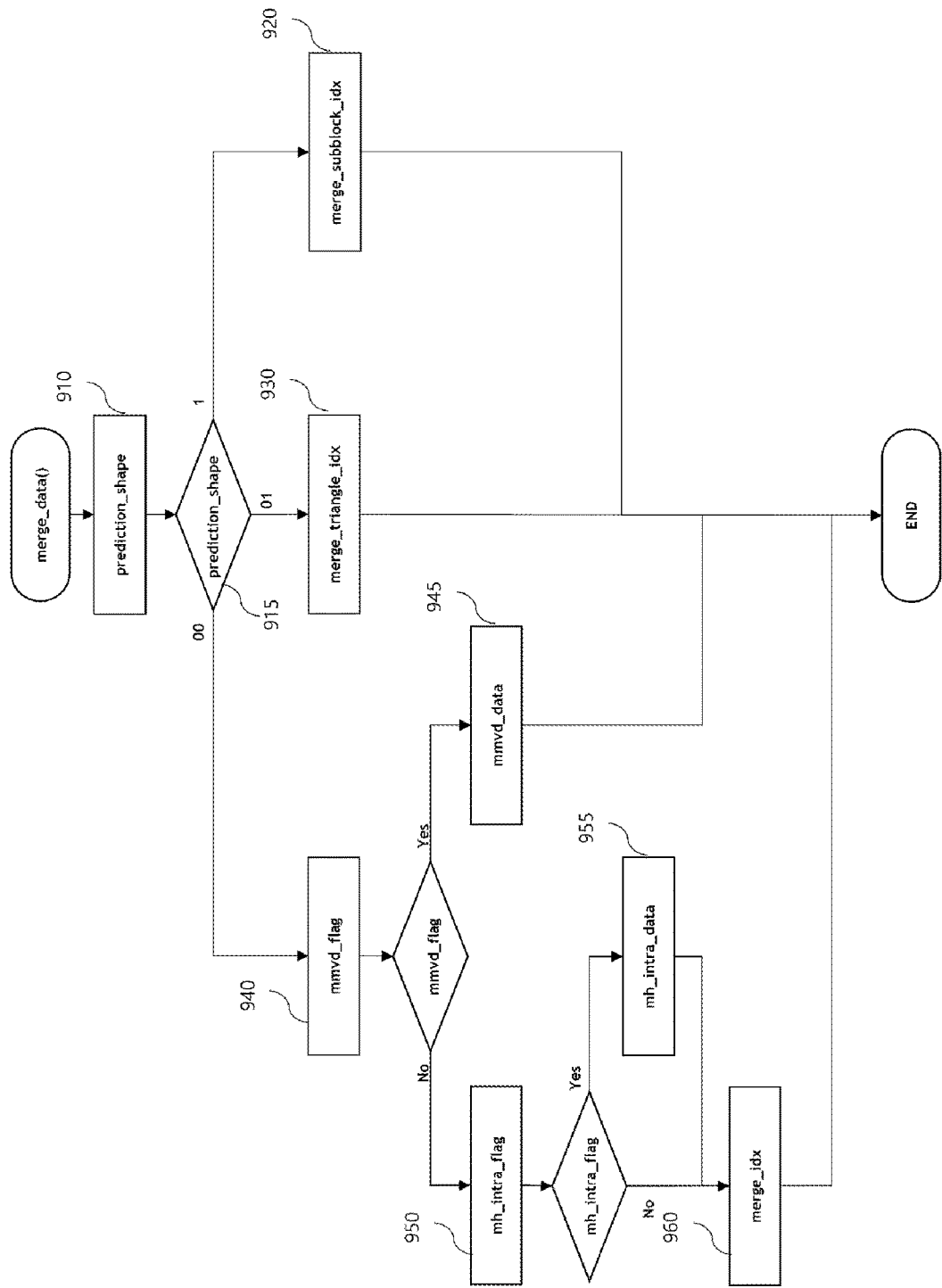
FIG. 9 is a flowchart about a method of parsing information on a prediction method of a block that is encoded in a skip and/or merge mode according to yet another embodiment of the present invention.

FIG. 9 is a flowchart about a method of parsing information on a prediction method of a block that is encoded in a skip and/or merge mode according to yet another embodiment of the present invention.

In the embodiment illustrated in FIG. 7, two syntax elements, merge_subblock_flag 710 and merge_triangle_flag 720 are used as a condition for determining whether or not to parse a next syntax element. On the other hand, in the example illustrated in FIG. 9, one syntax element, prediction shape 910 regarding a prediction form of a current block is used. Herein, the one syntax element prediction shape 910 regarding the prediction form of the current block may use a syntax form composed of 2 bins like 0, 10, 11 and 1, 01, 00.

Alternatively, the one syntax element prediction shape 910 regarding the prediction form may be used to classify not only prediction forms of block but also prediction methods. When there are two, three or a larger number of prediction methods to be classified, the number of bins may increase according to the number of prediction methods.

According to an embodiment of the present invention, when parsing prediction information of a current block, if the current block is encoded in a skip and/or merge mode, whether the current block is a block predicted in block units, in subblock units or in triangle units may be determined by parsing a syntax element for a prediction form of the current block.

Herein, as illustrated and described in the above drawings, the prediction information of the current block may consist of a flag indicating whether or not prediction for the current block is subblock-level prediction and/or a flag indicating whether prediction for the current block is triangle unit-level prediction or block-level prediction.

According to another embodiment of the present invention, prediction information of a current block may consist of a flag indicating whether or not prediction for the current block is block-level prediction and/or a flag indicating whether prediction for the current block is subblock-level prediction or triangle unit-level prediction.

Alternatively, a combination of the flags may be configured as one syntax element to mean a prediction form of the current block. The one syntax element may be composed of two bins.

When subblock-level prediction is performed for a current block, an index for subblock-level motion merge may be parsed. When triangle unit-level prediction is performed for a current block, a flag for a partition direction of triangle and an index for motion merge may be parsed. Herein, the index for motion merge may be parsed as many as the number of triangle units.

When block-level prediction is performed for a current block, an additional syntax may be parsed according to a type of a block-level prediction mode.

For example, a block-level prediction mode may be a CIIP (combined intra-inter prediction) mode, an MMVD (merge with mvd) mode and the like.

When MMVD is performed for a current block, information on MMVD may be signaled by a different method from the above-described embodiment. For example, when a current block is not a skip and/or merge mode, a syntax element for MMVD may be parsed.

According to another embodiment of the present invention, an MMVD mode may be signaled using another method for encoding motion information.

For example, according to an embodiment of the present invention, when a current block is not encoded in a skip mode or a merge mode, syntax related to MMVD mode may be signaled or parsed. Herein, the syntax related to MMVD mode may include information on whether or not a prediction mode of the current block is an MMVD mode (e.g., flag information), MMVD index information, MMVD distance information and/or MMVD direction information.

According to the present invention, a combined method of the above-described embodiments may be used to signal an MMVD mode.

FIG. 10 is a view illustrating a syntax table in which information on a prediction method of a block, which is not encoded in a skip and/or merge mode according to an embodiment of the present invention, is signaled by applying one or more motion information encoding methods according to the present invention.

Specifically, as illustrated in FIG. 10, information (e.g., flag) on whether or not a current block is encoded in a skip and/or merge mode may be parsed. When the information indicates that the current block is not encoded in a skip and/or merge mode, the one or more motion information encoding methods described above may be selected.

Herein, the one or more motion information encoding methods described above may be an AMVP mode or an MMVD mode. In addition, at least one of the AMVP mode and the MMVD mode may use an AFFINE mode. When the AFFINE mode is used, 2 pieces of motion information or 3 pieces of motion information are signaled according to a parameter model of the AFFINE mode and are parsed.

In addition, in case of an AMVP mode, the motion information may include a flag or index for a motion prediction value, a prediction direction for motion prediction, a reference picture index used for motion prediction and/or a differential motion vector. In case of an MMVD mode, the motion information may include a flag or index for a motion prediction value, distance information of a differential motion and/or direction information of a differential motion.

In the embodiment illustrated in FIG. 10, information for selecting at least one of a plurality of motion information encoding methods is included as a syntax element, and a step of parsing the syntax element may be included. In addition, the syntax element may be parsed without a predefined condition or be parsed only when a predefined condition is satisfied.

Herein, the predefined condition (e.g., conditions 800) may be a condition on at least one of a size of a block, a quantization parameter (QP), a type of a current tile group, a type of a current picture, and a type of a current slice.

As an example of the condition on the size of a block, the predefined condition may be whether or not the width and/or height of a current block is smaller than a predetermined threshold. Herein, the predetermined threshold may be 128.

Alternatively, as another example of the condition on the size of a block, the predefined condition may be whether or not the product (area) of the width and height of a current block is larger than a predetermined threshold. Herein, the predetermined threshold may be one of 32, 64, 128 and 256.

Alternatively, as an example of the condition on the type of a current tile group, the predefined condition may be whether or not the type of the current tile group is a B type, that is, a bi-predictive type.

Alternatively, as another example of the condition on the type of a current tile group, the predefined condition may be whether the type of the current tile group is a P type or a B type. That is, the predefined condition may be whether or not the current tile group performs inter prediction.

Alternatively, as an example of the condition on the type of a current picture, the predefined condition may be whether or not the type of the current picture is a B type, that is, a bi-predictive type.

Alternatively, as another example of the condition on the type of a current picture, the predefined condition may be whether the type of the current picture is a P type or a B type. That is, the predefined condition may be whether or not the current picture performs inter prediction.

FIG. 11 is a view illustrating a syntax table in which information on a prediction method of a block, which is not encoded in a skip and/or merge mode according to another embodiment of the present invention, is signaled by applying one or more motion information encoding methods according to the present invention.

Specifically, as illustrated in FIG. 11, information (e.g., flag) on whether or not a current block is encoded in a skip and/or merge mode may be parsed. When the flag indicates that the current block is not encoded in a skip and/or merge mode, the one or more motion information encoding methods described above may be selected.

Herein, a step of parsing a syntax element concerning whether or not to apply an AFFINE mode is performed first, and a step of parsing a syntax element for a motion information encoding method may be included or not included according to whether or not to apply the AFFINE mode.

According to an embodiment of the present invention, as a result of parsing a syntax element concerning whether or not to apply an AFFINE mode, when a current block is predicted by the AFFINE mode, a step of parsing a syntax element for the motion information encoding method may not be performed. That is, when an AFFINE mode is selected for the current block, motion information is signaled in an AMVP mode, and a method of parsing the motion information may be used.

On the other hand, when the current block is not predicted by the AFFINE mode, the step of parsing the syntax element for the motion information encoding method may be performed.

Herein, the one or more motion information encoding methods may be an AMVP mode or an MMVD mode. In addition, herein, at least one of the AMVP mode and the MMVD mode may use an AFFINE mode.

In addition, in case of an AMVP mode, the motion information may include a flag or index for a motion prediction value, a prediction direction for motion prediction, a reference picture index used for motion prediction and/or a differential motion vector. In case of an MMVD mode, the motion information may include a flag or index for a motion prediction value, distance information of a differential motion and/or direction information of a differential motion.

In the embodiment illustrated in FIG. 11, information for selecting at least one of a plurality of motion information encoding methods is included as a syntax element, and a step of parsing the syntax element may be included. In addition, the syntax element may be parsed without a predefined condition or be parsed only when a predefined condition is satisfied.

Herein, the predefined condition (e.g., conditions 900) may be a condition on at least one of a size of a block, a quantization parameter (QP), a type of a current tile group, a type of a current picture, and a type of a current slice.

As an example of the condition on the size of a block, the predefined condition may be whether or not the width and/or height of a current block is smaller than a predetermined threshold. Herein, the predetermined threshold may be 128.

Alternatively, as another example of the condition on the size of a block, the predefined condition may be whether or not the product (area) of the width and height of a current block is larger than a predetermined threshold. Herein, the predetermined threshold may be one of 32, 64, 128 and 256.

Alternatively, as an example of the condition on the type of a current tile group, the predefined condition may be whether or not the type of the current tile group is a B type, that is, a bi-predictive type.

Alternatively, as another example of the condition on the type of a current tile group, the predefined condition may be whether the type of the current tile group is a P type or a B type. That is, the predefined condition may be whether or not the current tile group performs inter prediction.

Alternatively, as an example of the condition on the type of a current picture, the predefined condition may be whether or not the type of the current picture is a B type, that is, a bi-predictive type.

Alternatively, as another example of the condition on the type of a current picture, the predefined condition may be whether the type of the current picture is a P type or a B type. That is, the predefined condition may be whether or not the current picture performs inter prediction.

Triangle partition prediction of the present disclosure, as illustrated in (c) of FIG. 3, is a prediction method that partitions a current coding block by using a diagonal line or an anti-diagonal line. However, the method of partitioning a current coding block is not limited to the example of (c) of FIG. 3. For example, a line for partitioning a current coding block may be a line that has an arbitrary starting point and an arbitrary angle. Alternatively, a line for partitioning a current coding block may be defined by an arbitrary starting point and an arbitrary ending point.

FIG. 12 is a view for explaining an example of dividing a current coding block by an arbitrary line.

As illustrated in FIG. 12, a current coding block may be predicted by being partitioned into various shapes by an arbitrary line. Herein, as described above, the arbitrary line partitioning the current coding block may be defined by a starting point and an angle or the starting point and an ending point. Alternatively, information on a partition line partitioning a current coding block is predefined in a decoder/encoder and an index is signaled through a bitstream so that a partition line partitioning the current coding block may be derived.

As illustrated in FIG. 12, a method of prediction by partitioning a current coding block using an arbitrary line may be referred to as geometric partition prediction. As triangle partition prediction may be included as one method of geometric partition prediction, when geometric partition prediction is used, information on triangle partition prediction may not be signaled.

That is, information on geometric partition prediction may be signaled instead of information on triangle partition prediction. Geometric partition prediction may be performed in the same way as the above-described triangle partition prediction. Accordingly, information on geometric partition prediction may be the same as information on triangle partition prediction.

However, the coding efficiency of geometric partition prediction may be higher than the coding efficiency of triangle partition prediction. That is, as a current block is predicted by being partitioned more sophisticatedly, the accuracy of prediction becomes higher and the coding efficiency may be improved accordingly.

As geometric partition prediction may have higher coding efficiency than triangle partition prediction, when geometric partition prediction is used instead of triangle partition prediction, a signaling and/or parsing order of a prediction method may be different in the above-described various embodiments.

The coding efficiency of geometric partition prediction may be higher than the coding efficiency of MMVD and/or multi hypothesis prediction. Accordingly, in this case, a signaling order of prediction methods may be an order of subblock-based merge, geometric partition prediction, MMVD, and multi hypothesis prediction. Alternatively, a signaling order of prediction methods may be an order of subblock-based merge, MMVD, geometric partition prediction, and multi hypothesis prediction.

Alternatively, a signaling order of prediction methods may be an order of geometric partition prediction, subblock-based merge, MMVD, and multi hypothesis prediction.

Figure 13:
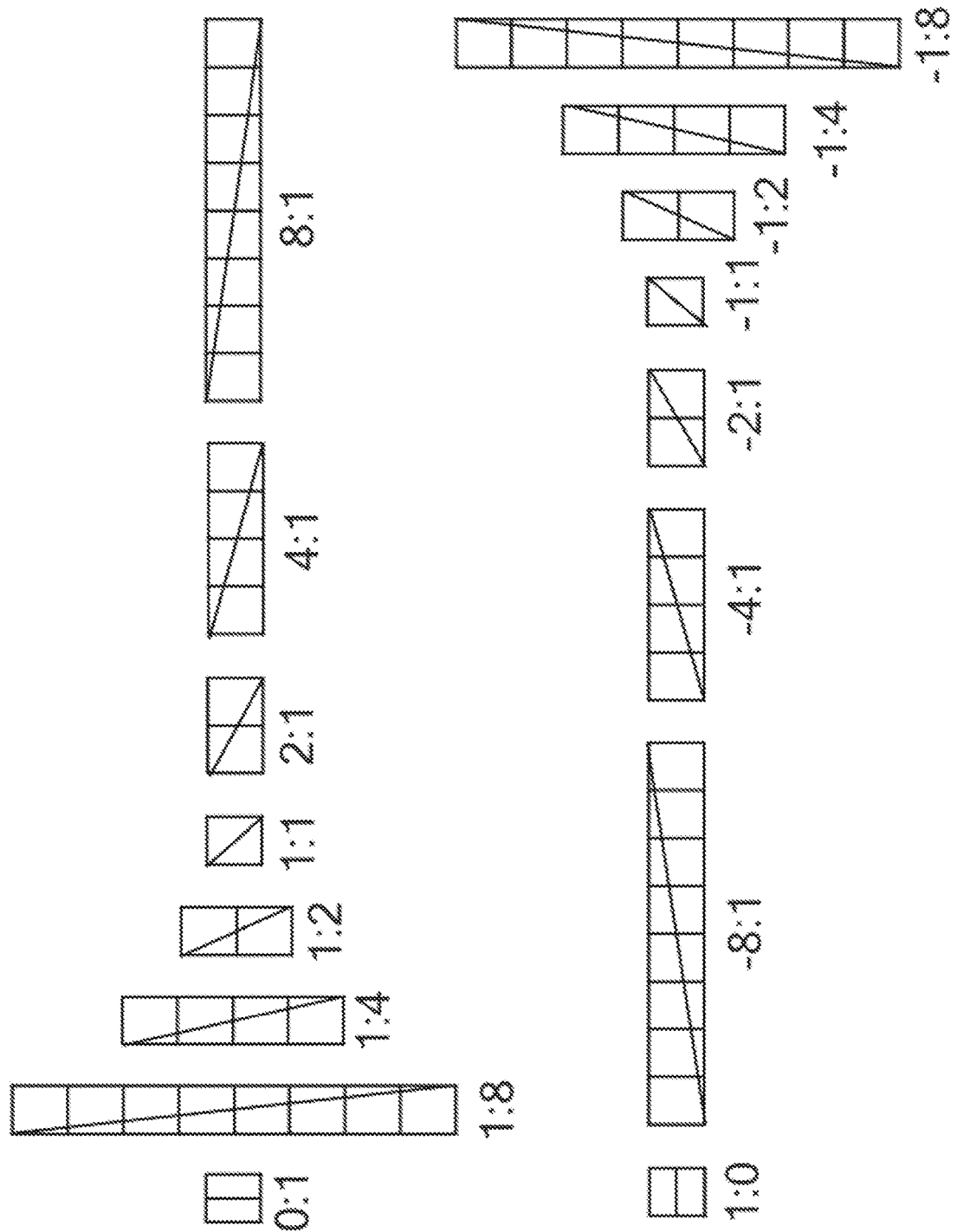
FIG. 13 is a view illustrating various angles of partition lines for geometric partition prediction.

FIG. 13 is a view illustrating various angles of partition lines for geometric partition prediction.

As illustrated in FIG. 13, an encoder/decoder may define an angle of a partition line of geometric partition prediction in advance.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

INDUSTRIAL APPLICABILITY

The present invention may be used to encode/decode an image.

The invention claimed is:

1. A method of decoding an image, the method comprising:

decoding information on a prediction method of a current block;

determining, based on the information on the prediction method, a prediction method of the current block; and generating a prediction block of the current block by performing prediction for the current block based on the determined prediction method, wherein the information on the prediction method includes at least one of information on subblock merge, information on MMVD, information on multi hypothesis prediction, or information on geometric partition prediction, wherein the multi hypothesis prediction represents a prediction method generating a final prediction block by combining a prediction block generated by an inter prediction and a prediction block generated by an intra prediction, wherein the information on the multi hypothesis prediction includes information indicating whether to perform the multi hypothesis prediction for the current block, and wherein the information on the geometric partition prediction is signaled when it is determined that the multi hypothesis prediction is not performed on the current block.

2. An apparatus for decoding an image, the apparatus comprising:
at least one processor,
wherein the processor is configured to:
decode information on a prediction method of a current block,
determine, based on the information on the prediction method, a prediction method of the current block, and
generate a prediction block of the current block by performing prediction for the current block based on the determined prediction method,
wherein the information on the prediction method includes at least one of information on subblock merge, information on MMVD, information on multi hypothesis prediction, or information on geometric partition prediction,
wherein the multi hypothesis prediction represents a prediction method generating a final prediction block by combining a prediction block generated by an inter prediction and a prediction block generated by an intra prediction,
wherein the information on the multi hypothesis prediction includes information indicating whether to perform the multi hypothesis prediction for the current block, and
wherein the information on the geometric partition prediction is signaled when it is determined that the multi hypothesis prediction is not performed on the current block.

3. A method of encoding an image, the method comprising:
determining a prediction method of a current block;
generating a prediction block of the current block by performing prediction for the current block based on the determined prediction method; and
encoding information on the prediction method of the current block,
wherein the information on the prediction method includes at least one of information on subblock merge, information on MMVD, information on multi hypothesis prediction, or information on geometric partition prediction,
wherein the multi hypothesis prediction represents a prediction method generating a final prediction block by combining a prediction block generated by an inter prediction and a prediction block generated by an intra prediction,
wherein the information on the multi hypothesis prediction includes information indicating whether to perform the multi hypothesis prediction for the current block, and
wherein the information on the geometric partition prediction is encoded when it is determined that the multi hypothesis prediction is not performed on the current block.

4. An apparatus for encoding an image, the apparatus comprising:
at least one processor,
wherein the processor is configured to:
determine a prediction method of a current block,
generate a prediction block of the current block by performing prediction for the current block based on the determined prediction method, and
encode information on the prediction method of the current block,
wherein the information on the prediction method includes at least one of information on subblock merge, information on MMVD, information on multi hypothesis prediction, or information on geometric partition prediction,
wherein the multi hypothesis prediction represents a prediction method generating a final prediction block by combining a prediction block generated by an inter prediction and a prediction block generated by an intra prediction,
wherein the information on the multi hypothesis prediction includes information indicating whether to perform the multi hypothesis prediction for the current block, and
wherein the information on the geometric partition prediction is encoded when it is determined that the multi hypothesis prediction is not performed on the current block.

5. A non-transitory computer-readable medium for storing a bitstream generated by an image encoding method,
wherein the image encoding method comprises:
determining a prediction method of a current block;
generating a prediction block of the current block by performing prediction for the current block based on the determined prediction method; and
encoding information on the prediction method of the current block,
wherein the information on the prediction method includes at least one of information on subblock merge, information on MMVD, information on multi hypothesis prediction, or information on geometric partition predictions,
wherein the multi hypothesis prediction represents a prediction method generating a final prediction block by combining a prediction block generated by an inter prediction and a prediction block generated by an intra prediction,
wherein the information on the multi hypothesis prediction includes information indicating whether to perform the multi hypothesis prediction for the current block, and
wherein the information on the geometric partition prediction is encoded when it is determined that the multi hypothesis prediction is not performed on the current block.

* * * * *